UNITED STATES PATENT OFFICE.

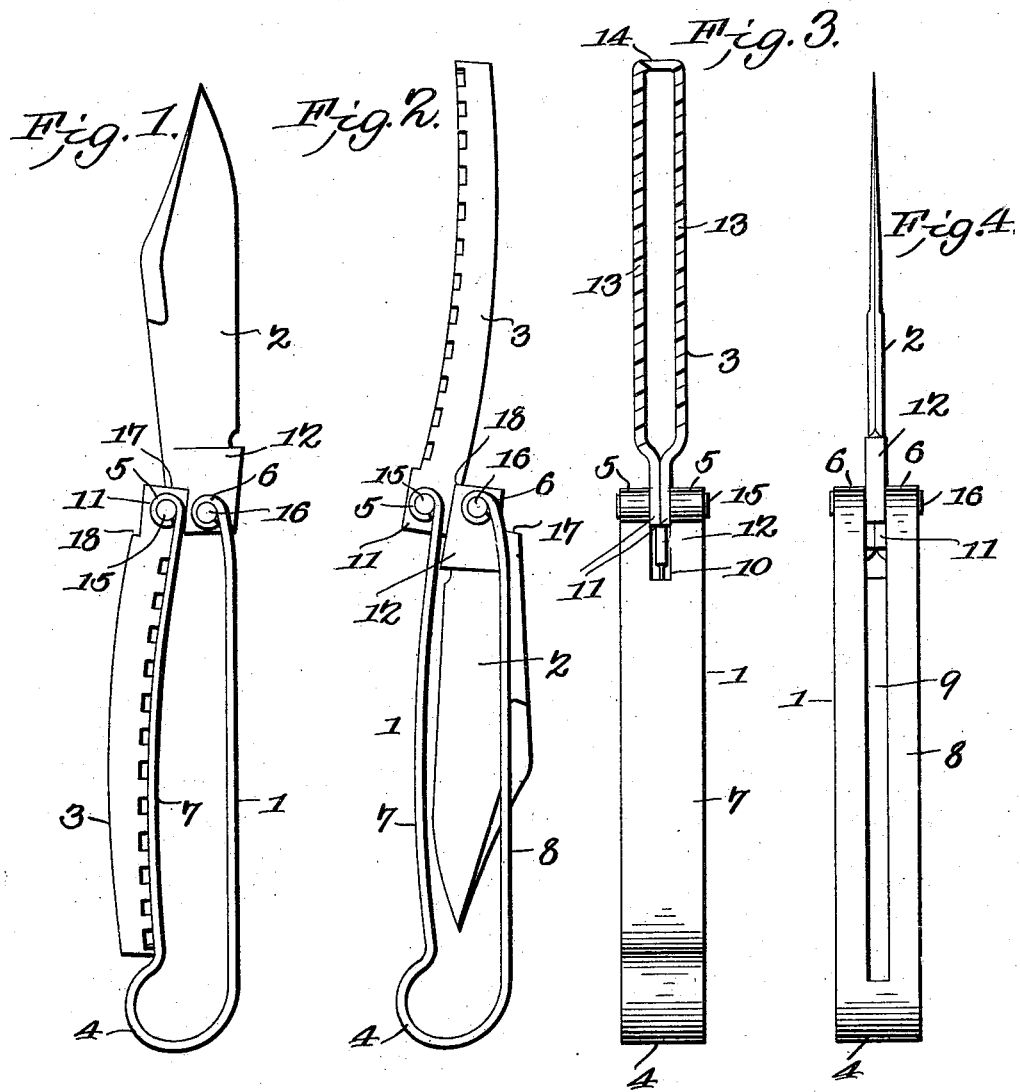

ISAAC ANDERSON, OF NEWCASTLE, INDIANA, ASSIGNOR OF ONE-HALF TO WILLIAM VALYAR, OF SAGINAW, MICHIGAN.

FISH SCALER AND CLEANER.

No. 841,099.       Specification of Letters Patent.       Patented Jan. 15, 1907.

Application filed January 29, 1906. Serial No. 298,454.

*To all whom it may concern:*

Be it known that I, ISAAC ANDERSON, a citizen of the United States, residing at Newcastle, in the county of Henry and State of Indiana, have invented a new and useful Fish Scaler and Cleaner, of which the following is a specification.

This invention relates to fish scalers and cleaners.

The object of the invention is to present in a compact and portable form a knife and scaler, the two parts being so constructed and assembled that when combined with a handle and one is open the other will act as a positive stop to hold it in operative position, whereby the usual small spring employed for this purpose is rendered unnecessary.

A further object is to improve the construction of the handle in such manner as positively to prevent the retention of scales, pieces of flesh and blood, and to permit ready cleansing when necessary.

With the above and other objects in view, as will appear as the nature of the invention is better understood, the same consists in the novel construction and combination of parts of a fish scaler and cleaner, as will be hereinafter fully described and claimed.

In the accompanying drawings, forming a part of this specification, and in which like characters of reference indicate corresponding parts, Figure 1 is a view in elevation exhibiting the implement with the knife opened and the scaler closed. Fig. 2 is a similar view exhibiting the knife closed and the scaler opened. Fig. 3 is an edge view exhibiting the operative face of the scaler. Fig. 4 is a similar view exhibiting the operative face of the knife.

The implement embodies a handle, (designated generally 1,) a knife 2 of any preferred shape, and a scaler 3. The handle is made, preferably, of a strip of tempered steel bent upon itself to provide at its bend a semi-loop 4, that operates as a guard for the end of the scaler and has its terminals provided with pairs of alined eyes 5 and 6, formed by bending the metal to the appropriate contour in any preferred manner. As shown in Fig. 3, the handle member 7, or that against which the scraper abuts, is solid throughout practically its entire length, while the handle member 8 is provided with a longitudinal slot 9, extending from the eyes 6 to the loop 4 and through which the blade of the knife projects when closed, as shown in Fig. 2. The normal tendency of the handle members is to spring inward to secure a function elsewhere discussed. The upper end of the handle member 7 is provided with a short slot 10 to receive the bolster 11 of the scraper, the bolster 12 of the knife being disposed within the slot 9, as clearly shown in Fig. 4.

The scraper 3 is constructed from a strip of steel bent to form a hollow rectangle and has its terminals deflected inward to lie against each other to form the bolster 11, as clearly shown in Fig. 3. The scraper is longitudinally bowed or curved, and on the concaved side thereof the members are provided with obliquely-disposed teeth 13, which are arranged, preferably, in break-joint order, thus to insure their taking positive hold upon the scales, the outer or free end of the scaler being provided with a double inclined tooth 14. By this arrangement of the teeth the entire concaved face of the scraper except at the bolster is rendered operative for doing efficient work. The scraper and knife are held combined with the handle members by rivets 15 and 16, that are passed through the pairs of eyes 5 and 6 and through the bolsters of the scraper and knife and have their terminals upset in any preferred manner.

As stated, one of the objects of the invention is so to construct and assemble the knife and scaler that when combined with the handle and either one is opened the other will act as a positive stop to hold it in operative position. This result is secured by providing the bolster of the knife with a shoulder 17, that is adapted to bear upon the end of the bolster 11 of the scaler when the former is opened, and by providing the scaler with a similar shoulder 18, that is adapted to bear upon the end of the bolster 12 of the knife when the former is opened, the two shoulders being held firmly locked together from the pressure exerted by the inward spring of the two handle members. By this arrangement it will be seen that either the scaler or knife will be held against rearward movement beyond a certain point without the employment of an ordinary handle-spring, such as employed, whereby the cost of production of the implement is lowered and the handle is permitted to be an open-work structure, thereby to preclude the retention of any foreign matter, such as scales or the like, which would result with the ordinary handle in use.

The improvements herein defined while simple in character will be found to unite in the production of a thoroughly efficient implement and one that will be positive in securing the objects sought.

It will be obvious that, if preferred, the sides of the handle may be closed in the usual manner, and as this will be obvious detailed illustration of such modification is omitted.

I claim—

1. An implement embodying a handle and a pair of members pivotally connected therewith and having their bolsters arranged to abut each other and interlock, and means acting on the bolsters to hold the members together in operative and inoperative positions respectively.

2. An implement comprising a handle embodying two spring portions, and a member pivotally connected with each of the spring portions, the bolsters of the two members being disposed to abut each other.

3. An implement comprising a handle embodying two spring portions provided with terminal eyes, one of the portions having a slot extending substantially throughout its entire length and the other a slot extending only a short distance of its length, a pair of members having their bolsters disposed in the slots, rivets secured in the eyes and operating to hold the members in position, one of the members being adapted to engage the longer slot when closed.

4. An implement of the class described comprising a handle constructed from a single piece of metal bent to the appropriate form to present two handle portions each provided with two terminal spaced eyes, two members having their bolsters mounted in the slots and held in position by rivets passing through the eyes, one of the members being provided with a cutting edge and the other with obliquely-disposed teeth.

In testimony that I claim the foregoing as my own I have hereto affixed my signature in the presence of two witnesses.

ISAAC ANDERSON.

Witnesses:
   DORSEY W. CONWELL,
   GUY R. ALBERTSON.